United States Patent [19]

DeCaprio

[11] Patent Number: 5,076,700
[45] Date of Patent: Dec. 31, 1991

[54] BONDED LIGHTWEIGHT MIRROR STRUCTURE

[75] Inventor: Alfred R. DeCaprio, Randolph, Mass.

[73] Assignee: Litton Systems, Inc., Lexington, Mass.

[21] Appl. No.: 630,903

[22] Filed: Dec. 20, 1990

[51] Int. Cl.$^5$ ............................................... G02B 7/18
[52] U.S. Cl. ................................... 359/848; 359/846; 359/883
[58] Field of Search ............... 350/607, 609, 610, 611, 350/641, 320

[56] References Cited

U.S. PATENT DOCUMENTS

| | | | |
|---|---|---|---|
| 3,507,737 | 4/1970 | Busdiecker | 350/320 |
| 3,613,222 | 10/1971 | Richey | 350/320 |
| 3,644,022 | 2/1972 | Jagdt et al. | 350/609 |
| 3,754,812 | 8/1973 | Mohn | 350/609 |
| 3,912,380 | 10/1975 | Klein | 350/609 |

OTHER PUBLICATIONS

Angel and Woolf, "Steps Toward 8-Meter Honeycomb Mirror Blanks: I. Rational and Approach", *Annals of the New York Academy of Sciences*, 1983, pp. 163-170.
Lewis et al., "Mirror Blank Manufacturing for the Emerging Market", 1982, *SPIE, vol. 332*, pp. 307-309.
Maran, "A New Generation of Giant Eyes Gets Ready to Prove the Universe", *Smithonian Magazine* (date unknown) pp. 41-53.

Primary Examiner—Bruce Y. Arnold
Assistant Examiner—J. P. Ryan
Attorney, Agent, or Firm—Michael H. Wallach; Robert F. Rotella

[57] ABSTRACT

A lightweight mirror is disclosed in which the core and backsheet of the mirror are constructed from a single piece of glass. The core is lightweighted by drilling or otherwise forming a series of pockets in the core with the machining process proceeding from the front of the core toward the backsheet. A plurality of walls left between each of the adjacent machined-out areas to provide the core with rigidity and to aid in supporting a facesheet on which a reflecting surface is formed. The facesheet is fastened to the rim of the core and to the walls which remain between the adjacent pockets in the core using a frit bonding process.

16 Claims, 1 Drawing Sheet

BONDED LIGHTWEIGHT MIRROR STRUCTURE

BACKGROUND OF THE INVENTION

1. Field of the Invention

This invention relates to the construction of mirrors for astronomical or surveillance applications in general and, in particular, to a construction for a large, lightweight mirror.

2. Description of the Prior Art

The use of large, lightweight mirrors for astronomical telescopes and for use in optical systems involved in surveillance applications is well known in the prior art. Historically, large mirrors used for astronomical applications have been manufactured from large monolithic blanks of glass with a reflecting surface supported by a relatively thick substrate to insure that the shape of the reflecting surface is accurately maintained both during the process of fabricating the mirror and after completion. As requirements evolved for increasingly larger surface mirrors with complex (i.e. non-spherical surface shapes), the use of the well-known expedient of increasing the thickness of the mirror blank to insure stability of the reflecting surface became less desirable due to the substantial increase in weight of the mirror's structure. Recent advances in technology have resulted in a need for very large diameter mirrors for both astronomical and surveillance applications. Frequently, the applications require that the mirrors be placed in earth orbit. In view of the foregoing requirements, it is particularly important that the mirrors be as light in weight as possible so as to lessen the payload required to be carried into space and, in the case of terrestrial applications, so that the weight of the mirror does not require excessively complicated support structures and, further, to avoid gravity-induced sag in the shape of the mirror's reflecting surface. In addition, when large lightweight mirrors are used in applications involving systems for changing the directions of orientation of the optics, the mirrors ideally should be of as light weight as possible to permit the adjustment of the mirror's tip or tilt using actuators which may be accurately controlled and which have relatively low output forces. The less the weight of the mirror whose orientation or position must be controlled, the smaller the amount of force that must be applied to change the orientation of the mirror.

In response to the difficulty of handling and fabricating large blanks of glass or other materials used for the manufacture of large surface area mirrors, techniques have been developed for producing lightweight mirror structures which result in relatively rigid reflecting surfaces having high optical tolerances, while reducing the over-all weight of the mirror's structure. Principally these techniques have involved the construction of composite mirrors with a center lightweighted core which is sandwiched between a facesheet and a backsheet which are bonded to the core. Notwithstanding the requirement for the mirror to be as light in weight as possible, the mirror must, while meeting the weight restrictions, have sufficient rigidity and stability so that it can be efficiently controlled and/or otherwise handled, and so that its reflecting surface can be precisely finished to insure optimum optical characteristics. Rigidity is often achieved by increasing the depth of the mirror's core. However, this results in an increase in the overall weight of the mirror structure. Representative patents disclosing prior known constructions for lightweight mirrors include U.S. Pat. No. 4,692,367 which issued on Sept. 8, 1987 and which discloses a construction for a lightweight mirror in which honeycomb panels comprises the core of the mirror, and back plate and face plate members are bonded to the core. U.S. Pat. No. 4,466,700 which issued Aug. 21, 1984 discloses a construction for a lightweight mirror in which still another arrangement for producing a lightweight core is described with the core being sandwiched between front and back plates to produce a lightweight mirror. U.S. Pat. No. 3,644,022 which issued Feb. 22, 1972 discloses a construction for a mirror in which the core is built-up from a plurality of y-shaped members which are jointed together to form a honeycomb structure.

In addition to producing lightweight mirrors by constructing a core of separate elements and bonding a facesheet and a backsheet to the composite core as described in the above-noted patents, the prior art discloses the manufacture of lightweight mirrors from a monolithic block of glass in which a number of cavities are machined into the core to reduce the weight of the core structure. Producing the cavities can be accomplished by physically machining a series of holes through the back surface of the mirror to create a honeycomb core structure which supports a front faceplate section of the core, on which the reflecting surface can be polished. However, use of the foregoing process, i.e. machining "lightweighting" holes from the back of the core toward the faceplate, requires that care be taken to avoid having the machine tool either puncture the faceplate as it approaches the front of the mirror, or leave an excessive amount of glass on the faceplate. In the case where the faceplate is punctured, it is virtually impossible to salvage the mirror structure and the entire mirror structure, together with all work accomplished to the time of damage, must be discarded. When excessive material is left on the faceplate, the inherent weight of the mirror structure is not reduced as much as possible and, in the case where the mirror's position is to be controlled by actuators, additional weight is retained in the facesheet which reduces the positioning performance of the mirror. In addition, the task of machining the core by entering the back of the core and machining toward the faceplate requires that the machining operation be precisely carried out as the coring machine approaches the facesheet to avoid damaging the facesheet. This dictates that additional time be utilized to manufacture the mirror and, for mirrors having very large surface areas, this additional machining time becomes appreciable.

SUMMARY OF THE INVENTION

A principle object of this invention is to provide a construction for a lightweight mirror in which a maximum amount of weight may be removed from the mirror's core without affecting the optical properties of the mirror's reflecting surface.

Another object of this invention is to provide a construction for a lightweight mirror in which the lightweighting of the mirror's core may be accomplished relatively efficiently.

Still another object of this invention is to provide a construction for a light weight mirror which will prevent the threat of damage of the mirror's reflecting surface during the process of machining material from the mirror's supporting core.

The above and other objects and advantages of the invention are achieved by machining a plurality of pockets in a core for a mirror by the process of machining the core from the front of the mirror toward the back. The machining process results in the production of a plurality of webs or supporting walls which are used to provide stiffness to the mirror core and to support a facesheet containing the mirror's reflecting surface. The facesheet may be attached to the core by frit bonding, which avoids the necessity of excessively heating the core and facesheet which would be required for a fused bond. After the facesheet is bonded to the core, optical surfacing of the facesheet may be completed by known techniques in which the finishing tool is lightly pressed against the facesheet while the lapping operation of the reflecting surface is completed. In the alternative, a tool and method as disclosed in U.S. patent application Ser. No. 07/612,180 filed Nov. 13, 1990, which is owned by the owner of this application and the teachings of which are incorporated herein by reference may be used to apply an optical-quality surface finish to the facesheet.

BRIEF DESCRIPTION OF THE DRAWING

The foregoing objects and other advantages of the invention will be readily understood by reference to the detailed description of a preferred embodiment when read in conjunction the accompanying drawing in which.

DETAILED DESCRIPTION OF A PREFERRED EMBODIMENT

Figure 1:
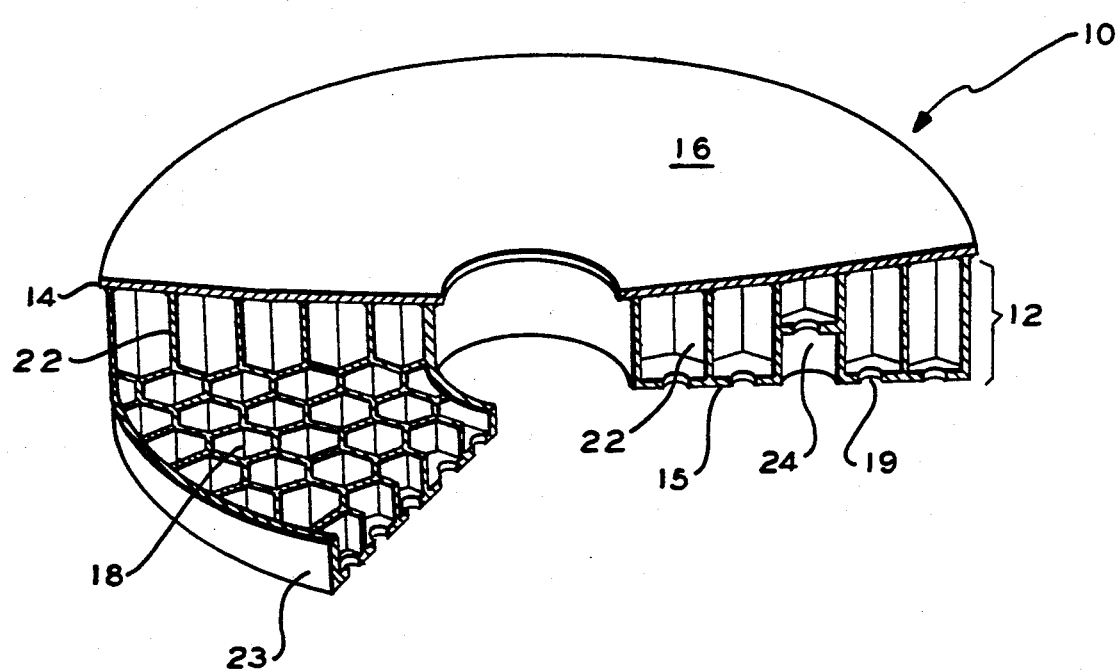
FIG. 1 is a perspective view partially in section of a lightweight mirror constructed in accordance with the teachings of the invention.

Referring to the drawing, FIG. 1 shows a lightweight mirror 10 constructed in accordance with the teachings of the invention. Mirror 10 includes a monolithic core 12 having a backsheet 15 formed integral with the core 12. A facesheet 14 is attached to the core 12 by a method which will be later described. The facesheet 14 includes an optical reflecting surface 16.

The core 12 is manufacture from a material having a low coefficient of thermal expansion of example Corning-brand ULE (Ultra-low Expansion) glass. The core 12 is lightweighted by machining or otherwise forming a series of pockets or spaces 18 in the core. The pockets 18 may be machined by using a multiple axis numerically controlled milling machine operating under computer control to machine away portions of the core 12 by proceeding from the front surface of the core toward the backsheet 15. During the machining process, a plurality of webs or walls 22 are left between adjacent pockets 18 in the core 12. The webs 22 provide stiffness to the core 12 and also provide points at which the facesheet 14 may be fastened to the core 12. In the preferred embodiment disclosed herein, the pockets 18 are hexagonal in shape. While it is easiest to manufacture pockets having a hexagonal shape due to the obtuse angles formed by the intersecting walls 22 forming each of the pockets 18, it is to be understood that the pockets 18 may take any appropriate shape including, for example, rectangular, triangular or square shapes. After the pockets 18 have been machined, the core may be sprayed or dipped in an acid, for example hydrofluoric acid, to clean out the pockets, to stress relieve the core, and to produce additional lightweighting of the core by etching away material in the core. In the preferred embodiment, each pocket 18 is provided with a hole 19 in the backsheet to permit equalization of atmospheric pressure between facesheet and backsheet. The holes 19 may be drilled into the core 12 prior to machining of the pockets 18.

The facesheet 14 is constructed from a material having a closely equivalent or identically coefficient of thermal expansion as the material from which the core 12 has been constructed. The reflecting surface 16 of the facesheet 14 may be lapped in a technique known to those skilled in the art to produce a "nearly finished" reflecting surface prior to assembly of the facesheet 14 onto the core 12. For example, a lapping tool and process similar to those described in the aforementioned co-pending U.S. patent application Ser. No. 07/612,180 may be used to produce a nearly finished optical surface. After the rough lapping of the reflecting surface has been completed, the facesheet 14 is ready for joining to the core 12. While any known technique may be used to fasten the facesheet 14 to the core 12, for example an epoxy bond, the preferred embodiment disclosed herein contemplates use of a frit bond. The use of a frit bond between the facesheet 14 and the core 12 is preferable to the use of an epoxy bond since an epoxy bond may suffer from weakening due to the presence of atmosphere moisture at the time that the bond between the two pieces of material is created. The process of fusing the two parts is also undesirable since fusing involves firing of the components to be joined to the point at which the material from which the facesheet and core are made softens, which causes considerable risk of distortion of a very thin facesheet. The frit bonding method involves the use of a wet frit paste which is applied to the ribs 22 and the outer wall 23 of the core 12 and then dried to remove volatile solvents from the frit paste. The bonding process is completed by placing the facesheet 14 on the core and aligning it with respect to the ribs 22 and outer wall 23 of the core 12 and then elevating the temperature of the core 12 and facesheet 14 to melt the material in the frit paste after the organic bonding material of the frit paste has been boiled out. Since a lower temperature is needed to form the frit bond than would be used during a fusing process, there is less likelihood of slumping of the facesheet 14 between the supporting ribs 22 with the attendant degradation of the quality of the finish of the optical surface. Final finishing of the reflecting surface 16 on the facesheet 14 to obtain a reflecting surface of the described optical quality may be completed after the completion of the frit bonding process. Optical finishing of the facesheet 14 may be done by successive lapping of the reflecting surface 16 using successively finer pitches to produce a surface geometry and a surface finish suitable for use in the optical application to which the mirror 10 is to be applied. Since the facesheet 14 is not fastened to the core at the time of machining of the pockets 18 to produce the lightweight core 12, the possibility of damage being done to the facesheet 14 during the milling process is reduced. In addition, since the facesheet 14 is attached to the core 12 after completion of the milling process, a much thinner facesheet 14 may be utilized than in prior art lightweight mirror designs, yielding significant weight savings, since the saving in weight is achieved across the entire surface area of the facesheet 14.

While any known method may be used for supporting the mirror 10, for example a clamp applied to the outside wall 23 of core 12, it is also possible to machine the core 12 from the backsheet 15 side toward the center of the core 12 with mounting holes 24 prior to commencing fabrication of the lightweighted core. Sufficient material can be left in the central portion of the core 12 to provide stiffness and support for the desired mounting arrangement. For example, three mounting holes 24 may be spaced equidistant from the center of core 12 and at 120° intervals for each other to permit a tripod mount (not shown) to be used to support the mirror 10. The holes 24 are drilled in the body of the core 12 through backsheet 14 prior to the removal of the material from the core 12 to form the pockets 18.

While the disclosed invention has particular utility for the construction of large mirrors, it should be apparent to those skilled in the art that the disclosed construction is also applicable to mirrors of any size. Because many variations to the described invention may become apparent to those skilled in the art, it is to be understood that the scope of the invention is to be restricted only insofar as required by the scope of the appended claims.

I claim:

1. A lightweight mirror comprised of:
   A. A core manufactured from a material having a low coefficient of thermal expansion, said core including a front portion and a rear portion, the rear portion of said core including a backsheet portion integral with said core, said core further including a rim portion around the edge of said core and a plurality of pockets machined into said core from the front portion of said core to reduce the weight of said core, each of said pockets being open along the front portion of said core and substantially closed along the rear portion of said core, said core also containing a plurality of thin internal walls formed between adjacent ones of said pockets as a result of machining said pockets, said walls separating adjacent pockets from each other; and
   B. A facesheet bonded to the front portion of said core, said facesheet having a reflecting surface on a side of said facesheet opposite the side of said facesheet that is fastened to said core.

2. The lightweight mirror of claim 1 wherein a frit bond is used to fasten said facesheet to the outer rim of said core.

3. The lightweight mirror of claim 2 wherein said facesheet is also fastened to each of said internal walls of said core by a frit bond.

4. The lightweight mirror of claim 3 wherein said facesheet is manufactured from the same material as said core.

5. The lightweight mirror of claim 3 wherein said backsheet contains one or more holes for fastening said lightweight mirror to a support fixture.

6. A lightweight mirror having a core with a plurality of pockets machined into said core to reduce the weight of said core, said core including a backsheet section integral with said core, the adjacent pockets of said core being separated from each other by thin substantially planar walls, the pockets in said core being open on the side of said core opposite said backsheet, and a lightweight facesheet bonded to the side of said core opposite said backsheet, said facesheet having a mirrored reflecting surface on the side of said facesheet opposite the side bonded to said core.

7. The lightweight mirror of claim 6 wherein said facesheet is bonded to the core by a frit bond.

8. The lightweight mirror of claim 6 wherein at least a majority of the pockets in said core are hexagonal in shape.

9. A composite mirror having a large, mechanically stable reflecting surface, said composite mirror being comprised of a core having a front surface and a rear surface, said core being divided into a plurality of pockets for reducing the weight of said core, each of said pockets being formed in said core by removing material from the front surface of said core toward the rear surface with sufficient material being removed from each of said pockets so that adjacent ones of said pockets are separated by thin, substantially planar walls; a facesheet containing the reflecting surface on one side thereof, said facesheet being fastened to the front surface of said core; and means for fastening said facesheet to said core; whereby the shape of the reflecting surface is mechanically stabilized by said core.

10. The composite mirror of clam 9 wherein said facesheet is fastened to said core along at least the rim of said core and to the walls of said core.

11. The composite mirror of claim 10 wherein said facesheet is fastened to said core along the rim of said core and to the walls of the chambers in said core.

12. The composite mirror of claim 10 wherein said core and said facesheet are manufactured from a glass having a low coefficient of thermal expansion.

13. The composite mirror of claim 12 wherein said facesheet is fastened to said core with a frit bond.

14. The composite mirror of claim 11 wherein each of the chambers in said core have at least one vent hole passing through the backsheet of said core.

15. The composite mirror of claim 10 wherein said facesheet has a non-planar reflecting surface.

16. The composite mirror of claim 11 wherein said core has three apertures passing through the backsheet into said core to receive means for mounting said composite mirror to a support means, each of said apertures being located 120° apart from the adjacent aperture.

* * * * *